United States Patent [19]
Foegelle

[11] 3,969,179
[45] July 13, 1976

[54] CURING APPARATUS FOR RETREADING SYSTEM

[75] Inventor: Herman J. Foegelle, Lodi, Calif.

[73] Assignee: Lodi Division Intercole Automation, Inc., Lodi, Calif.

[22] Filed: Jan. 27, 1975

[21] Appl. No.: 543,996

Related U.S. Application Data

[63] Continuation-in-part of Ser. No. 381,218, July 20, 1973, abandoned.

[52] U.S. Cl.................................. 156/394; 156/96; 425/24; 425/44; 425/387 R
[51] Int. Cl.².......................................... B29H 5/04
[58] Field of Search...... 156/96, 110, 123, 126–129, 156/394, 394 FM; 264/36, 315, 316, 326, 89; 425/17, 21–26, 32, 35, 36, 39, 43, 44, 45, 47, 387, 389, 390

[56] References Cited
UNITED STATES PATENTS

| | | | |
|---|---|---|---|
| 3,236,709 | 2/1966 | Carver | 156/96 |
| 3,585,686 | 6/1971 | Balle | 425/23 |
| 3,729,358 | 4/1973 | Barefoot | 156/128 R |
| 3,743,564 | 7/1973 | Gross | 156/96 |
| 3,779,833 | 12/1973 | Reppel | 156/96 |
| 3,884,739 | 5/1975 | Hindin et al. | 156/96 |

Primary Examiner—Douglas J. Drummond
Assistant Examiner—John E. Kittle
Attorney, Agent, or Firm—Keith D. Beecher

[57] ABSTRACT

Curing apparatus is provided which may be used for vulcanizing a pre-cured tread onto a suitably prepared tire casing; the pre-cured tread being initially adhesively attached to the tire casing. The apparatus provides a mold defining a chamber in which the tire casing and adhesively attached pre-cured tread are placed; and it includes means for establishing pressurized fluid, such as steam or air, within the interior of the tire casing, and pressurized fluid, such as steam, in the annular space between the casing and the inside peripheral surface of the chamber, so that a required heat and pressure condition may be established within the chamber to cause the tread to be vulcanized and permanently bonded to the casing. The apparatus of the invention, in a second embodiment, is used for vulcanizing uncured rubber to a tire casing to form the tread. The apparatus automatically maintains a pre-set pressure between the pressurized fluid within the tire casing and the pressurized fluid within the mold, so that optimum curing conditions may be established throughout the vulcanizing process, without any possibility of damage to the tread or casing, or to the bond between the tread and casing.

6 Claims, 4 Drawing Figures

CURING APPARATUS FOR RETREADING SYSTEM

This application is a continuation-in-part of copending application Ser. No. 381,218 which was filed July 20, 1973 in the name of the present inventor, now abandoned.

BACKGROUND OF THE INVENTION

One well-known process for retreading tires comprises the technique of adhesively attaching a pre-cured tread onto a suitably prepared tire casing by means of a layer of appropriate bonding material, and of then subjecting the tire and tread assembly to heat and pressure so as to bond the tread permanently to the casing. Another prior art process comprises placing the casing in an appropriate curing chamber, and vulcanizing a tread of uncured rubber directly onto the periphery of the casing.

In carrying out the retreading technique by which a pre-cured tread is bonded to a tire casing, the casing is first buffed to remove as much of the old tread as possible. A strip of pre-cured tread is then cemented around the periphery of the buffed tire casing, and the assembly is covered by a thin envelope composed of a rubber-like material. A special inner tube, known as curing bag, may then be inserted into the interior of the tire casing to retain pressure within the tire during the curing process or, in some instances, pressure may be introduced directly into the casing itself. A special inner rim is mounted in place between the beads of the tire so that pressure can be maintained inside the tire during the curing process.

The assembly is then placed into a lower section of a mold, and the upper section of the mold is placed over the assembly to provide and enclosed curing chamber, the two sections being held together by an appropriate locking ring. Pressurized air may then be introduced into the curing bag within the tire casing in the chamber, or pressurized steam may be introduced directly into the tire casing; and pressurized steam is then introduced into the annular space between the tread/casing combination and the inner peripheral surface of the curing chamber to create the pressure and temperature necessary to bond the tread permanently to the tire casing by vulcanizing action.

As the steam pressure outside of the tread/casing combination in the curing chamber is increased, the pressure within the casing should similarly be increased to prevent the tire from being bulged inwardly, and thereby destroying the bond between the tread and the peripheral surface of the tire casing. As the pressure outside of the tire is increased to exceed normal atmospheric pressure, the pressure inside the tire may be similarly increased without any adverse effect on the tire. The apparatus of the invention assures that a predetermined pressure differential between the inside and outside pressures will be retained, and it automatically maintains the predetermined pressure differential throughout the process, so as to avoid damage to the casing, or destruction of the bond between the casing and the tread, as could occur should the pressure differential exceed certain limits.

Specifically, the present invention in one of its aspects is concerned with improved apparatus which provides a curing chamber for bonding a pre-cured tread strip to a tire casing, and in which the proper amount of pressure and heat is provided to effectuate the bond, without any likelihood of damage to the casing or destruction of the bond. In the apparatus to be described, in certain of its embodiments, pressurized steam is introduced into the curing chamber to supply the required temperature and pressure for permanently bonding the pre-cured tread to the tire casing; and pressurized air or steam pressure is introduced into the casing itself to offset the steam pressure in the chamber so as to prevent the tire from buckling or collapsing.

In accordance with the aforesaid embodiments of the invention, the pressure differential between the internal and external pressures is automatically maintained at a pre-set value throughout the curing process, and excessive pressure differentials are prevented. As noted, such excessive pressure differentials not only could destroy the bond between the tread and tire casing, but could also result in permanent damage to the casing itself.

In general, the apparatus of the invention provides an automatic regulator control system for maintaining the pressure differential between the pressurized fluid outside the casing and the pressurized fluid inside the casing at a pre-set value throughout a bonding or vulcanizing process, so as to preclude any possibility of an excessive pressure differential being established which not only could result in preventing a good bond between the tread and the casing, but could result in damage to the tread or to the casing itself.

DETAILED DESCRIPTION OF THE ILLUSTRATED EMBODIMENTS

Figure 1:
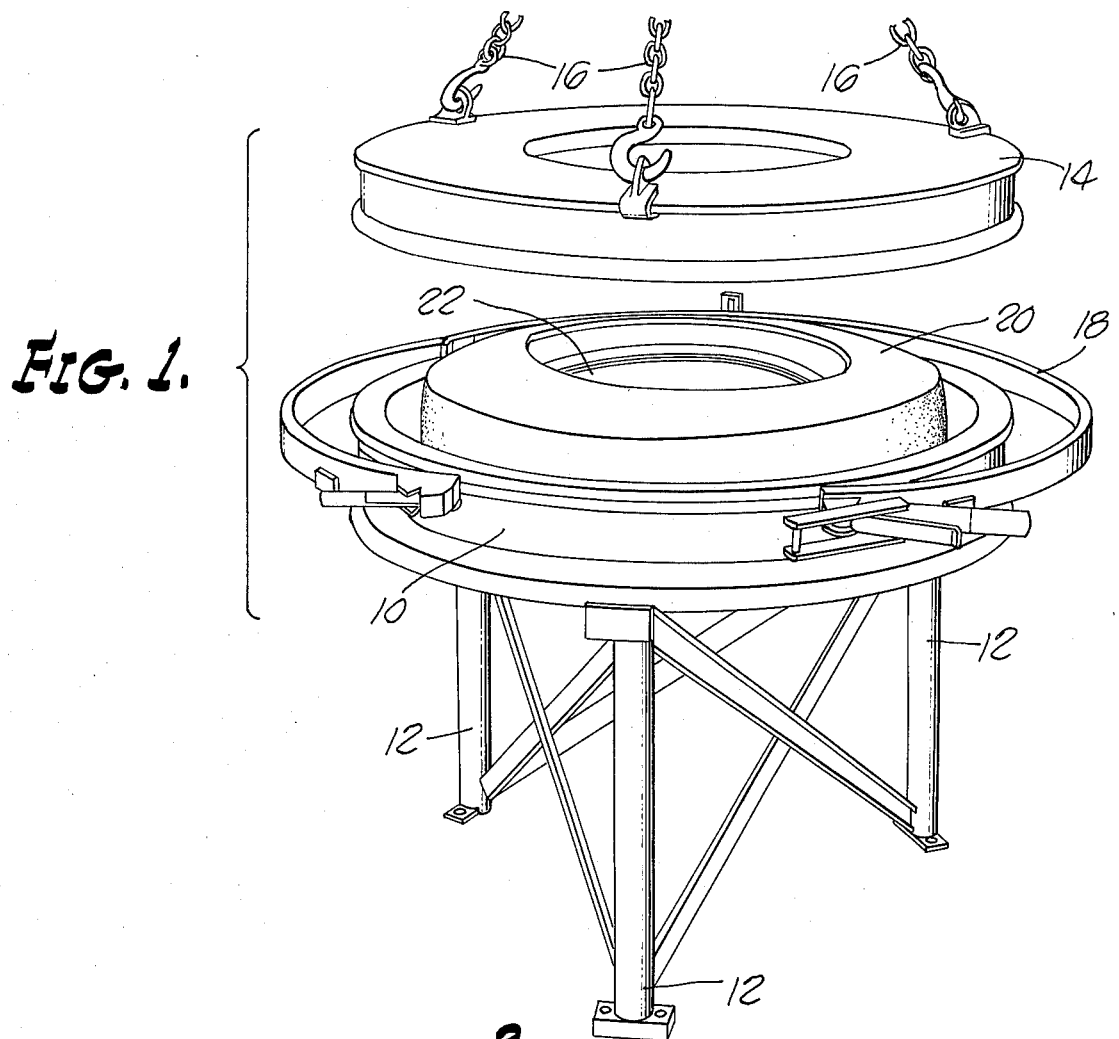
FIG. 1 is a perspective representation of a curing mold which may be incorporated into the apparatus and system of the invention in one of its embodiments, the representation of FIG. 1 showing the mold in an open condition.
Figure 2:
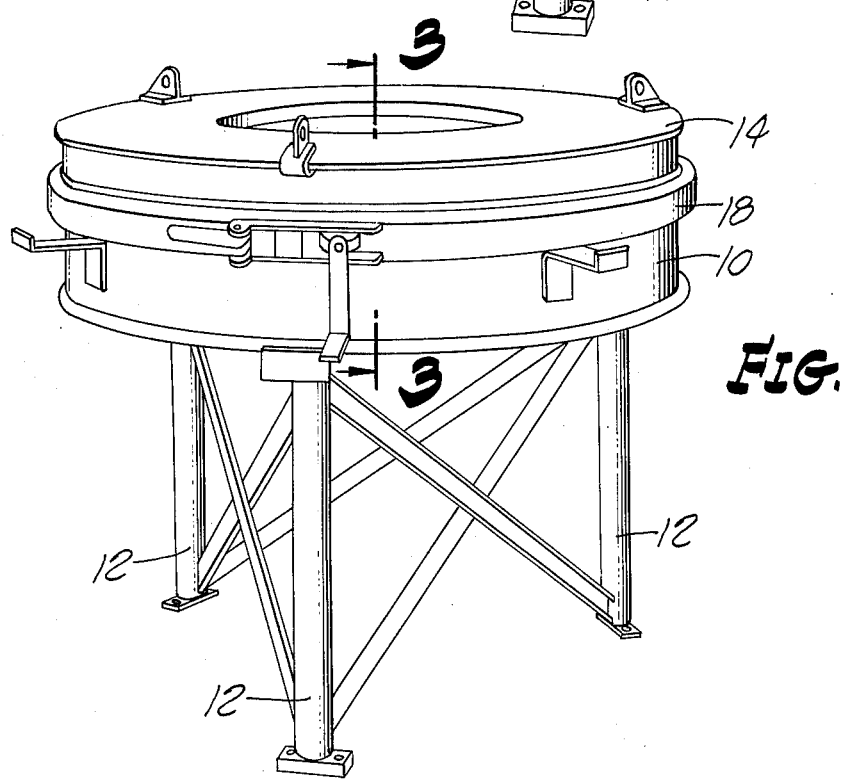
FIG. 2 is a perspective representation, similar to the representation of FIG. 1, but showing the mold in a closed condition.
Figure 3:
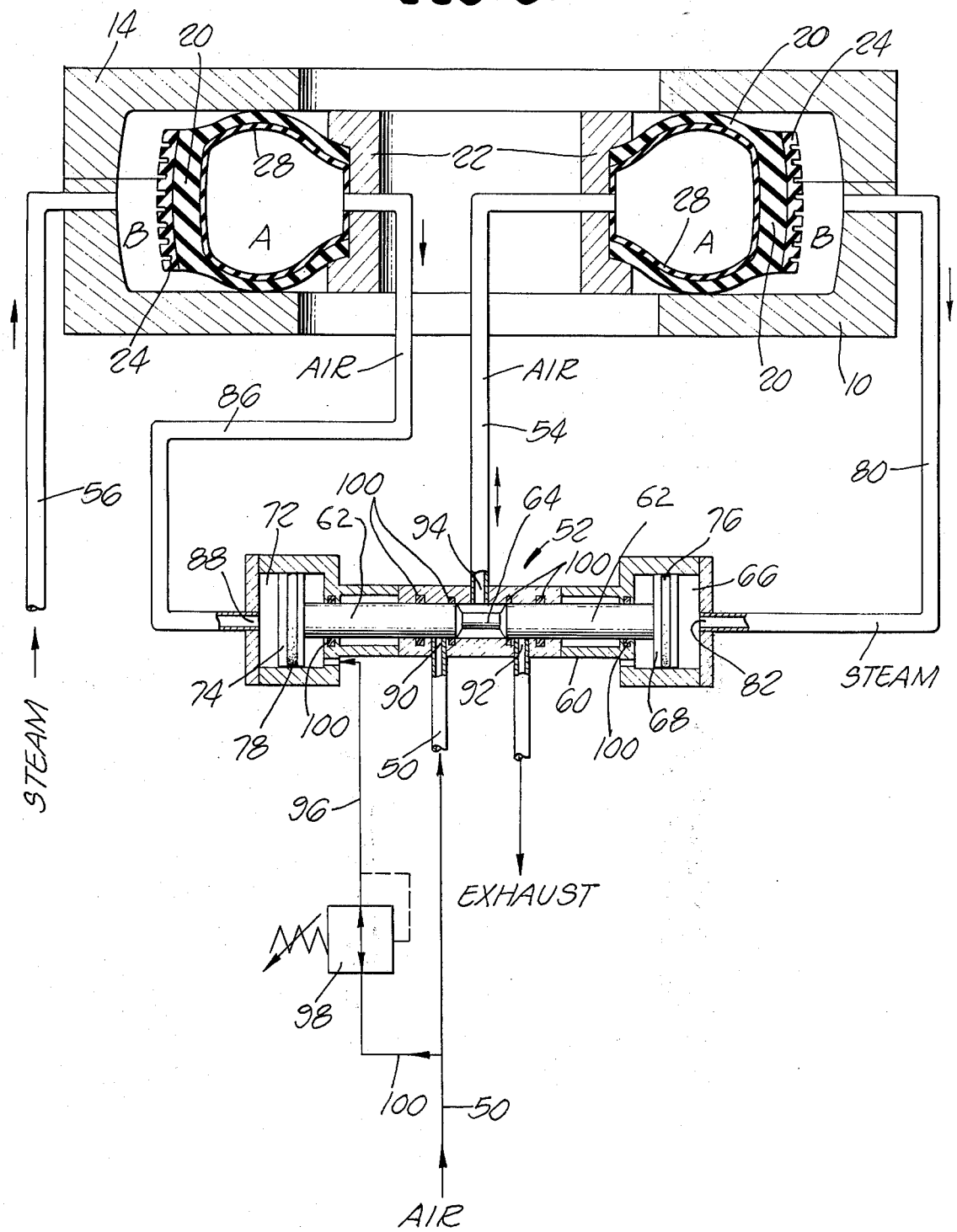
FIG. 3 is a cross-section of the mold of FIG. 2, taken essentially along the line 3—3 of FIG. 2, and also showing a sectional representation of an associated system for introducing pressurized fluid into the mold, and into the interior of the tire casing in the mold, and showing diagrammatically a system for controlling the pressure differential of the fluids.

The apparatus shown in FIGS. 1, 2 and 3 comprises, for example, a lower annular mold section 10 which is supported on an appropriate stand, such as the stand designated 12. The apparatus also includes an upper annular mold section 14 which may be lowered in place over the lower section 10 by means of a hoist including hooks and chains 16. The upper mold section is held firmly in place on the lower section by means of an annular locking ring 18. A tire 20 is engaged by a rim 22 which engages the beads of the tire. The tire 20 and rim 22 are positioned within the lower mold section 10 and centered therein, with the outer peripheral surface of the tire spaced radially inwardly from the inner peripheral surface of the chamber.

As described briefly above, in preparing the tire assembly, the tire casing is first buffed to remove the old tread and a pre-cured tread strip 24 (FIG. 3) is wrapped around the periphery of the buffed casing and stitched in place. An outer rubber skin may be wrapped around the tire casing and the tread; and a curing bag 28, in the form of a special inner tube, is inserted into the casing, and the rim 22 is positioned on the beads of the casing. The tire is then placed in the lower supported mold section 10. The upper mold section 14 is then lowered in place by the aforesaid hoist, and the assembly is locked together by the locking ring 18, so as to assume the form shown in FIGS. 2 and 3.

As shown in FIG. 3, pressurized air is introduced into the interior A of the curing bag 28 in the interior of the casing of tire 20. The air is so introduced from an appropriate air source through a pipeline 50. The pressurized air from the pipeline 50 passes through a valve 52 to a pipeline 54, the pipeline 54 extending through the rim 22 into the interior A of the curing bag 20. As a preliminary operation, pressurized air is introduced through pipeline 54 into the interior A of the curing bag until a normal pressure for the tire is achieved of the order, for example, of 28 psi for a usual passenger car tire.

Then, pressurized steam is introduced, through the chamber section 10 by way of a pipeline 56, into the annular space between the tire 20 and the inner peripheral surface of the curing chamber formed by the mold sections 10 and 14. This steam provides the pressure and temperature necessary to bond the tread 24 to the tire casing. The steam pressure may be of the order of 60 psi, for example, under which conditions the internal pressure in the interior A of the curing bag 28 is increased to a level of the order of 100 psi, so as to prevent buckling of the tire, and to assure a perfect bond between the tread and tire casing.

The air pressure within the curing bag 28 is automatically maintained at the desired differential with respect to the steam pressure in the annular space A by means of the valve 52. The valve 52 includes a central elongated cylindrical section 60, and a spool 62 which slides in the central bore of the cylindrical section 60. The spool 62 extends axially through the section 60 to the right into an enlarged cylindrical end section 66, in which it is connected to a piston 68, the piston 68 moving reciprocally within the cylindrical section 66. The spool 62 also extends through the central cylindrical section 60 to the left into an enlarged cylindrical end section 72, in which it is connected to a piston 74 which moves reciprocally back and forth in the cylindrical end section 72.

The piston 68 is sealed to the wall of the cylindrical end section 60 by means of an appropriate sealing ring 76, whereas the piston 74 is sealed to the wall of the cylindrical end section 72 by an appropriate seal 78. The spool 62 has a central section 64 of reduced diameter which functions as a port. A pipeline 80 couples the annular space B to a port 82 in the cylindrical end section 66 of valve 52. Likewise, a conduit 86 couples the chamber A within the curing bag 28 to a port 88 in the cylindrical end section 72 of the valve.

The pipeline 50 is coupled to a port 90 in the central cylindrical section 60 on one side of the central section 64 of spool 62, and a second port 92 is provided in the central cylindrical section 60 on the other side of the central spool section 64, and is opened to the atmosphere. The pipeline 54 is coupled to a port 94 in the central cylindrical section 60 which is intermediate the ports 90 and 92. Air pressure is introduced to the cylindrical end section 72 on the opposite side of the piston 74 through a pipeline 96 which is coupled through a manually controlled air pressure regulator valve 98 to the conduit 50. Appropriate seals 100 are provided between the spool 62 and the inner wall of the central cylindrical section 60.

It will be appreciated that as the steam pressure in the annular chamber B increases, the piston 68 will be forced to the left in FIG. 3 moving the spool 62 to the left in the central cylindrical section 60. On the other hand, as the air pressure within the chamber A in the curing bag 28 increases, the piston 74 is moved to the right in the cylindrical end section 72, moving the spool 62 to the right in the central cylindrical section 60.

In the operation of the system of FIG. 3, initially the steam pressure is at zero, and the valve 52 is operated by air pressure through the pipeline 96 to displace the spool 62 to the left in the central cylindrical section 60. For the left-hand position of the spool 62, the port 92 is blocked by the spool and the port 90 is coupled to the port 94 by the central section 64 of the spool, so that air from the valve 52 is free to flow into the chamber A. The chamber A now becomes filled with pressurized air to a predetermined pressure, and this air also flows through pipeline 86 and port 88 into the cylindrical end section 72 of the valve 52. As the air pressure increases in the cylindrical end section 72, its force on piston 74 overcomes the force of the air from regulator 98, and the spool 62 moves to the right in cylindrical section 60 to assume the illustrated position in FIG. 3 so as to terminate any further introduction of pressurized air into the chamber A.

Steam is now introduced into the chamber B through pipeline 56. The steam passes through the pipeline 80 and port 82 into the cylindrical end section 66 of the valve 52. As the pressure in the cylindrical end section 66 increases, aided by the pressure in the right-hand side of the cylindrical end section 72, the spool 62 moves to the left in cylindrical section 60 allowing air pressure to increase in chamber A.

Any increase in steam pressure in chamber B causes the spool 62 to shift to the left in cylindrical section 60, so that air is permitted to pass through the port 90 to the port 94 to introduce additional pressurized air into the interior A of the curing bag 28, so that the pressure differential may be maintained. On the other hand, should the steam pressure drop in chamber B, the air pressure in chamber A would force the spool 62 to the right in cylindrical section 60, coupling the port 94 to the port 92, so that a corresponding amount of compressed air can be discharged from the chamber A, again to maintain the desired pressure differential.

The valve 98 is manually adjustable to introduce a predetermined amount of air pressure into the right-hand side of the cylindrical end section 72 to enable a manually settable threshold to be established for the ratio between the air pressure in the chamber A and steam pressure in the annular chamber B, and the valve 52 then operates automatically to maintain that threshold.

Figure 4:
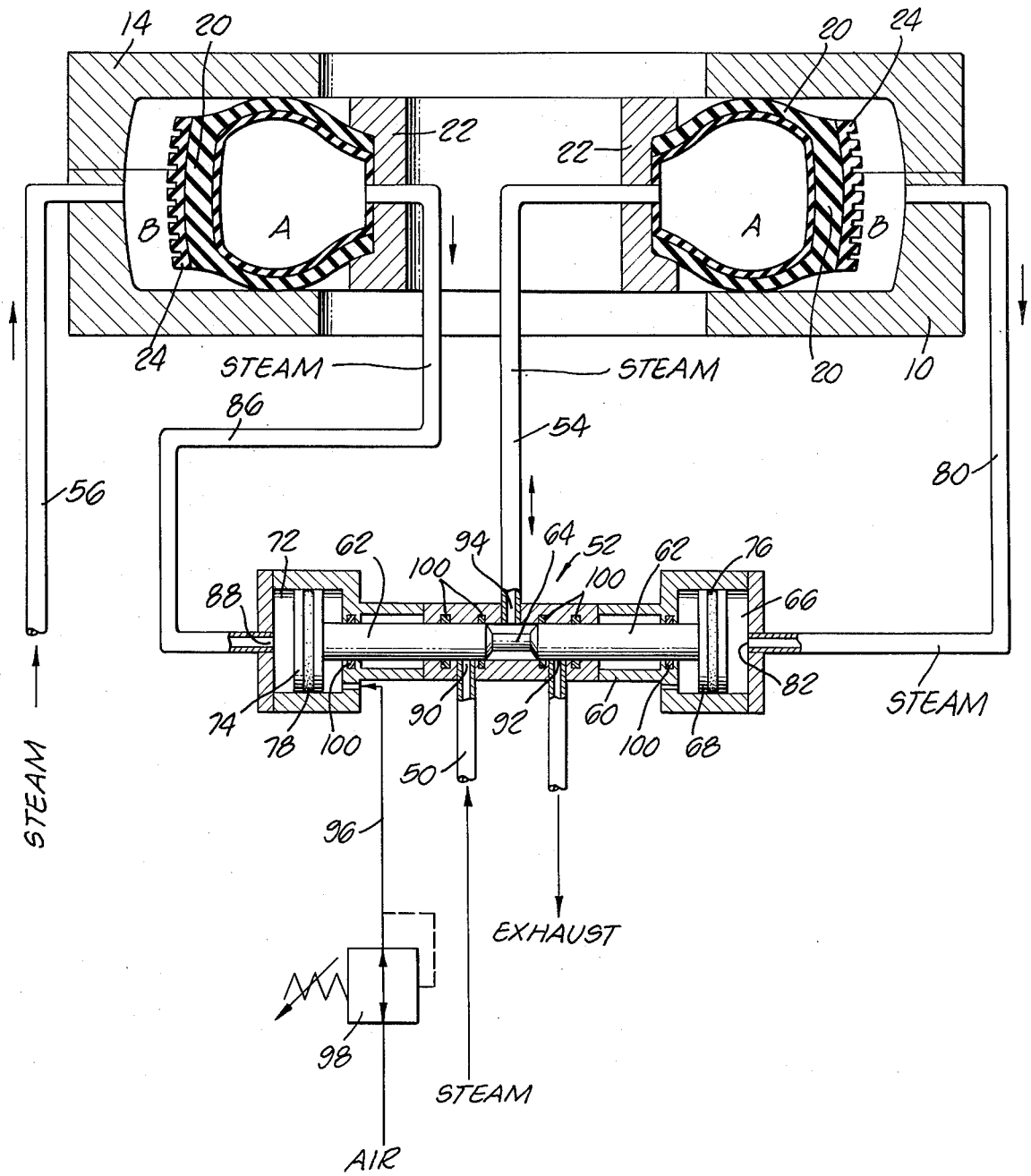
FIG. 4 is a view like FIG. 3 of a slightly modified embodiment in which pressurized steam is introduced into the mold and into the interior of the tire casing.

The embodiment of FIG. 4 is generally similar to that of FIG. 3, and like components have been designated by the same numbers. The embodiment of FIG. 4 finds utility in retreading tubeless tire casings. In the embodiment of FIG. 4, the curing bag 28 is dispensed with, and pressurized steam, rather than compressed air is introduced directly into the interior A of the tire casing 20. The couplings to the valve 52 are changed, so that the pipeline 50 may be coupled to the source of pressurized steam, rather than to a source of pressurized air. This embodiment dispenses with the need for a pressurized air source.

In the embodiment of FIG. 4, pressurized steam is introduced into the interior A of the tire 20. The pressurized steam from the pipeline 50 passes through the valve 52 to the pipeline 54 which extends through the rim 22 into the interior A of the tire.

As a preliminary operation, pressurized steam is introduced into the interior A of the tire until a normal pressure for the tire is achieved of the order, for example, of 28 psi for a usual passenger car tire. Then, pressurized steam is introduced through the chamber section 10 by way of pipeline 56, and into the annular space B between the tire and the inner peripheral surface of the curing chamber formed by the mold sections 10 and 14. As in the previous embodiment, this steam provides the pressure and temperature necessary to bond the tread 24 to the tire casing 20.

As before, the steam pressure in the annular chamber B may be of the order of 60 psi, under which conditions the internal steam pressure in the chamber A is increased to a level of the order of 80 psi, so as to prevent buckling of the tire, and to assure a perfect bond between the tread and the tire casing. The steam pressures in the chambers A and B are automatically maintained at the desired differential by means of the valve 52 which operates in the same manner as described above to maintain the pressure differential set by the preliminary adjustment of the regulator valve 98.

It will be appreciated that while particular embodiments of the invention have been shown and described, modifications may be made. It is intended in the claims to cover the modifications which come within the spirit and scope of the invention.

What is claimed is:

1. Apparatus for bonding a pre-cured strip of retread stock to the periphery of a tire casing, said apparatus comprising: at least one annular-shaped member defining a curing chamber for receiving the tire casing to be processed with the strip of retread stock extending around the periphery of the tire casing and in a position spaced radially inwardly from the inner peripheral surface of the chamber with the sides of the casing engaging the walls of the chamber to form a seal for the annular space between the strip and the inner peripheral surface of the annular-shaped member; an inner rim member for engaging the beads of the tire casing positioned within said annular-shaped member to hold the beads with a predetermined axial spacing and to provide an enclosed chamber within the tire casing; a valve including a central elongated cylindrical section and first and second cylindrical end sections, an elongated spool reciprocally slidable in the central elongated cylindrical section and connected to a first piston in said first cylindrical end section and to a second piston in said second cylindrical end section, said central elongated section having a central port therein and second and third ports displaced on either side of the central port, and said spool having a central section shaped to provide a path between the central port and the first port when the spool moves in one direction, and to provide a path between the central port and the second port when the spool moves in the opposite direction; a first pipeline extending from said central port through said inner rim member for introducing a first pressurized fluid into the interior of said tire casing when said spool moves in one direction, and for exhausting the first pressurized fluid from the interior of said tire casing when said spool moves in the opposite direction; a second pipeline extending through said annular-shaped member for introducing a second pressurized fluid at a relatively high temperature into the annular space between the tire and the inner peripheral surface of the annular-shaped member; a source of the first pressurized fluid coupled to the second port; an exhaust line coupled to the third port; a third pipeline extending through the annular-shaped member and coupled to the interior of the first cylindrical end section to introduce the second pressurized fluid from said annular space to one side of the first piston; and a fourth pipeline extending through said inner rim member and coupled to the interior of the second cylindrical end section to introduce the first pressurized fluid from the interior of said tire casing to one side of the second piston, thereby to cause the valve to couple the first pipeline to the source of first pressurized fluid when the pressure of the first pressurized fluid in the tire casing falls below the pressure of the second pressurized fluid in the annular space, and to cause the valve to couple the first pipeline to the exhaust line when the pressure of the first pressurized fluid in the tire casing rises above the pressure of the second pressurized fluid in the annular space, for maintaining a predetermined pressure differential between said first pressurized fluid in the interior of the tire casing and said second pressurized fluid in the annular space.

2. The apparatus defined in claim 1, in which said first pressurized fluid is pressurized air, and said second pressurized fluid is pressurized steam.

3. The apparatus defined in claim 1, and which includes a manually controlled pressure regulator valve coupled to the first-named valve for introducing pressurized fluid into the second cylindrical end section on the other side of said second piston at a particular pressure to establish the pressure differential between the first and second pressurized fluids at which the first-named valve will operate.

4. The apparatus defined in claim 1, in which said first pressurized fluid and said second pressurized fluid are both derived from the same source.

5. The apparatus defined in claim 4, in which said first pressurized fluid and said second pressurized fluid are both pressurized steam.

6. The apparatus defined in claim 4, and which includes a manually controlled pressure regulator valve coupled to the first-named valve for introducing a pressurized fluid from a second source into the second cylindrical end section on the opposite side of said second piston at a particular pressure to establish the pressure differential between the first and second pressurized fluids at which the first-named valve will operate.

* * * * *